United States Patent
Ausserlechner (10) Patent No.: US 10,801,828 B2
(45) Date of Patent: Oct. 13, 2020

(54) MAGNETIC ANGLE SENSING SYSTEM AND METHOD FOR DETECTING A ROTATION ANGLE OF A MAGNETIC FIELD SOURCE

(71) Applicant: Infineon Technologies AG, Neubiberg (DE)

(72) Inventor: Udo Ausserlechner, Villach (AT)

(73) Assignee: Infineon Technologies AG, Neubiberg (DE)

(*) Notice: Subject to any disclaimer, the term of this patent is extended or adjusted under 35 U.S.C. 154(b) by 125 days.

(21) Appl. No.: 15/848,139

(22) Filed: Dec. 20, 2017

(65) Prior Publication Data

US 2018/0172423 A1    Jun. 21, 2018

(30) Foreign Application Priority Data

Dec. 20, 2016 (DE) .................. 10 2016 124 952

(51) Int. Cl.
*G01B 7/30* (2006.01)
*G01D 5/14* (2006.01)
*G01D 5/244* (2006.01)
*G01B 7/00* (2006.01)

(52) U.S. Cl.
CPC .............. *G01B 7/30* (2013.01); *G01B 7/003* (2013.01); *G01D 5/142* (2013.01); *G01D 5/145* (2013.01); *G01D 5/24438* (2013.01)

(58) Field of Classification Search
CPC combination set(s) only.
See application file for complete search history.

(56) References Cited

U.S. PATENT DOCUMENTS

2006/0161378 A1* 7/2006 Moller .................. G01D 5/34
702/150
2015/0137796 A1* 5/2015 Ausserlechner ......... G01B 7/30
324/207.2

FOREIGN PATENT DOCUMENTS

DE    102014116842 A1   6/2015

OTHER PUBLICATIONS

German Patent Office, Office Action issued for DE 102016124952.1, 5 pgs., dated Sep. 5, 2017.
U. Ausserlechner, "A Theory of Magnetic angle Sensors With Hall Plates and Without Fluxguides", Progess in Electromagnetics Research B, vol. 49, pp. 77-106, 2013.
M. Metz, et al., "Contactless Angle Measurement Using Four Hall Devices on Single Chip", 4 pgs., IEEE, 1997.
T. Takahashi, et al., "Development of a High Precision Angle Sensor", 6 pgs., NTN Technical Review, No. 73, 2005.

* cited by examiner

*Primary Examiner* — Jay Patidar
(74) *Attorney, Agent, or Firm* — Schiff Hardin LLP (57) ABSTRACT

A magnetic angle sensing system for detecting a rotation angle of a magnetic field source arranged rotatably around a rotation axis, the magnetic angle sensing system including at least two magnetic field sensing elements that are located in/on a plane, are not arranged on a single straight line through the rotation axis, and are configured to provide output signals that are functions of the same magnetic field component which is in parallel to the rotation axis. The system also including a processor that is arranged to determine the rotation angle from an angle between a pointer and a reference direction, wherein the pointer is determined based on the output signals of the at least two magnetic field sensing elements.

16 Claims, 6 Drawing Sheets

MAGNETIC ANGLE SENSING SYSTEM AND METHOD FOR DETECTING A ROTATION ANGLE OF A MAGNETIC FIELD SOURCE

BACKGROUND

Embodiments of the present d relate to a magnetic angle sensor arrangement that allows determining a rotational position or movement of a shaft.

SUMMARY

A first embodiment relates to a magnetic angle sensing system for detecting a rotation angle of a magnetic field source arranged rotatably around a rotation axis, the magnetic angle sensing system comprising at least two magnetic field sensing elements located in/on a plane, wherein the at least two magnetic field sensing elements are not arranged on a single straight line through the rotation axis, are configured to provide output signals that are functions of the same magnetic field component which is in parallel to the rotation axis, and a processor that is arranged to determine the rotation angle from an angle between a pointer and a reference direction, wherein the pointer is determined based on the output signals of the at least two magnetic field sensing elements.

A second embodiment relates to a method for detecting a rotation angle of a magnetic field source which is arranged rotatably around a rotation axis, wherein at least two magnetic field sensing elements are located in/on a plane, are not arranged on a single straight line through the rotation axis, are configured to provide output signals that are functions of the same magnetic field component which is in parallel to the rotation axis, the method comprising determining the rotation angle from an angle between a pointer and a reference direction, wherein the pointer is determined based on the output signals of the at least two magnetic field sensing elements.

A third embodiment is directed to a tangible computer program product directly loadable into a memory of a digital processing device, comprising software code portions for performing the steps of the method as described herein.

A fourth embodiment is directed to a tangible computer-readable medium having computer-executable instructions adapted to cause a computer system to perform the steps of the method as described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION

Examples described herein in particular refer to magnetic angle sensors, where a permanent magnet is attached to a rotatable shaft and a magnetic field sensor is placed on or off the rotation axis and adjacent to the magnet. The magnetic angle sensor detects the rotatable magnetic field, which points in axial direction, and therefrom it infers the rotational position of the shaft. The magnet can be magnetized homogeneously in diametrical direction, but it can also be magnetized inhomogeneously, e.g., in arc-shape or half of the magnet can be magnetized in axial direction and the other half of the magnet can be magnetized in opposite direction. The magnet may also comprise several disjoint parts glued together or it may be assembled otherwise.

Figure 1:
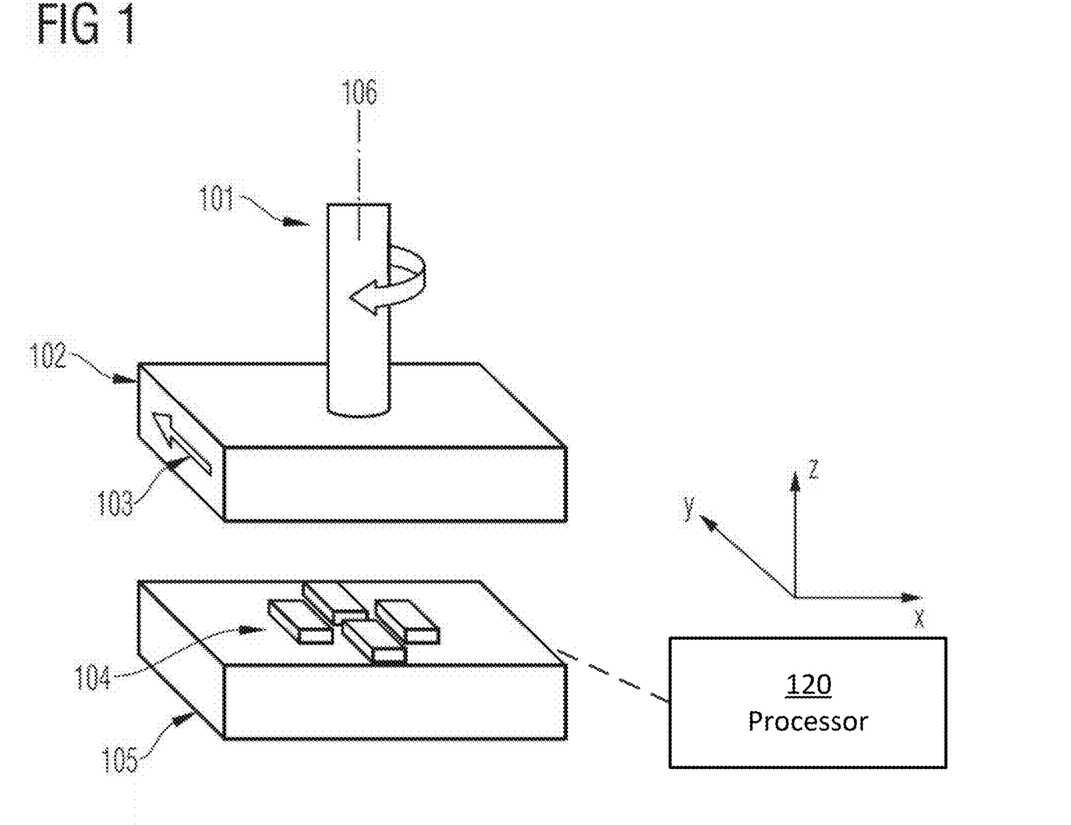
FIG. 1 shows an exemplary arrangement of an angle sensor device that determines an angle of a shaft, wherein the angle may be used to determine a movement and/or position of the shaft.

FIG. 1 shows an exemplary arrangement: A shaft 101 is arranged rotatable around a rotation axis 106. A magnet 102, e.g., a permanent magnet, is connected, e.g., fixed, to the shaft 101. The magnet 102 shows a diametrical magnetization 103. A silicon die 105 comprising several magnetic field sensors 104 is arranged in the vicinity of the magnet 102, in this example below the magnet 102. Each magnetic field sensor may also be referred to as sensing element. The magnetic field sensors 104 are configured to provide output signals to a processor 120.

A z-component is referred to as a component parallel to the rotation axis of the shaft (or along the shaft itself), an x-y-plane is perpendicular to the rotation axis of the shaft. The x-y-z-components span a Cartesian coordinate system. Hence, the rotation axis 106 is parallel to the z-axis and the magnetic field sensors 104 are arranged in the x-y-plane. An axial magnetic field sensor is in particular responsive to a z-component of a magnetic field emitted by the magnet 102.

Various sensors can be used, e.g., an anisotropic magneto-resistor (AMR), a giant magneto-resistor (GMR), a tunneling magneto-resistor (TMR), Hall-effect devices (e.g., Hall plates, vertical Hall-effect devices) or MAG-FETs (e.g., split-drain MAG-FETs).

Examples referred to herein in particular reference magnetic field sensors that detect the z-component of the magnetic field. Hence, the magnetic field sensor may comprise a Hall plate (also referred to as HHall) and/or a MAG-FET.

In a known approach, several Hall plates are arranged on a sensing plane, i.e. on a surface of a semiconductor die, perpendicular to the rotation axis. The Hall plates are positioned around a center where the rotation axis intersects the plane. The signals of the Hall plates are combined in a way to extract the slope of the axial magnetic field component in two (preferably) orthogonal directions.

Using the Cartesian coordinates (x, y, z) with z being parallel to the rotation axis and the x- and y-axes spanning the sensing plane, which comprises the Hall plates that extract the magnetic field components dBz/dx and dBz/dy, i.e., gradients (=spatial derivatives of the vertical magnetic field component Bz).

Such sensor system acts as a vector gradiometer, wherein the term "vector" indicates that two gradients d/dx and d/dy are detected. In order to detect the gradient dBz/dx, two Hall plates can be arranged on a line parallel to the x-axis and they are spaced apart by a small spacing delta_x. This allows the sensor system to determine $$(Bz(x0+\text{delta}\_x)-Bz(x0))/\text{delta}\_x,$$

which may be a suitable approximation for dBz(x0)/dx as long as delta_x is small, such that the Bz(x) dependency can be approximated linearly (i.e. as long as the curvature of this function can be neglected).

Sensor systems of this kind can be found in [M. Metz, et al.: Contactless Angle Measurement Using Four Hall Devices on Single Chip, 1997 International Conference on Solid-State Sensors and Actuators, Chicago, Jun. 16-19, 1997, IEEE], [U. Ausserlechner: A theory of magnetic angle sensors with hall plates and without fluxguides, Progress In Electromagnetics Research B, Vol. 49, 77-106, 2013] or [Takahashi, et al.: Development of a High Precision Angle Sensor, NTN TECHNICAL REVIEW No. 73, pages 98 to 103, 2005].

An angle detection scheme is in particular described in section 2.3 of [Takahashi et al.]. This reference suggest an approach to detect locations on the sensing plane, where the magnetic field component Bz vanishes. From these locations, the rotational position of the magnet (and hence the shaft) can be determined. Reference is also made to appendix D of [U. Ausserlechner].

The vertical magnetic field component Bz is a function of a lateral position (x,y) on the semiconductor chip. There is a curve (approximately a straight line) where this vertical magnetic field component vanishes, i.e. where Bz(x,y)=0.

This curve goes through the point in the (x,y)-plane where the rotation axis intersects the (x,y)-plane. The coordinate system can be shifted such that this intersection point is the origin (x,y)=(0,0). The sensor system places a significant number of sensor elements along a closed path encircling this origin (0,0). Hence, there are always two points where this closed path intersects with the Bz(x,y)=0-curve. These two points define a direction, which is equal to the rotational position of the magnet.

If the sensor is shifted laterally the Bz(x,y)=0-curve also shifts on the chip. If the sensor elements are shifted by an offset d from the origin (0,0), the sensor system may encounter severe problems. If the semiconductor chip (on which the sensor elements are located) is shifted by more than the offset d from the rotation axis in a direction orthogonal to the Bz(x,y)=0-curve, the Bz(x,y)=0-curve will not intersect with the closed path anymore and there will be no two sensor elements available that could still detect Bz=0. Hence, the sensor system fails to determine a rotational position of the magnet.

For example: If the chip is smaller than 1 mm the offset d is smaller than 0.5 mm; the sensor system will encounter problems if the chip is shifted by 0.5 mm or more off the rotation axis.

A similar problem occurs if a homogeneous magnetic disturbance Bz is superimposed to the field of the magnet: This will move (shift up or down) the Bz(x,y)-mountain emitted by the magnet towards the sensor system thereby shifting the Bz(x,y)=0-curve laterally. If the external disturbance is larger than the field of the magnet, this will shift the Bz(x,y)=0-curve outside of the closed path of the sensor elements. In such case, the sensor elements cannot detect any locations where Bz=0 and the sensor system fails to determine the rotational position of the magnet.

Examples described herein in particular suggest an approach to determine the rotation angle from a set of measured magnetic field values at flexible locations.

In an exemplary embodiment, a linear sensor is used, which supplies an output signal that is a linear function of the magnetic field applied. Such linear sensor may be a Hall plate, also referred to as HHall. In such case, there is no need for arranging a large number of sensor elements along a closed path around the rotation axis. Instead, only a few sensor elements can be used and an interpolation can be conducted when a zero (or a minimum) of the magnetic field component Bz is detected.

Figure 2:
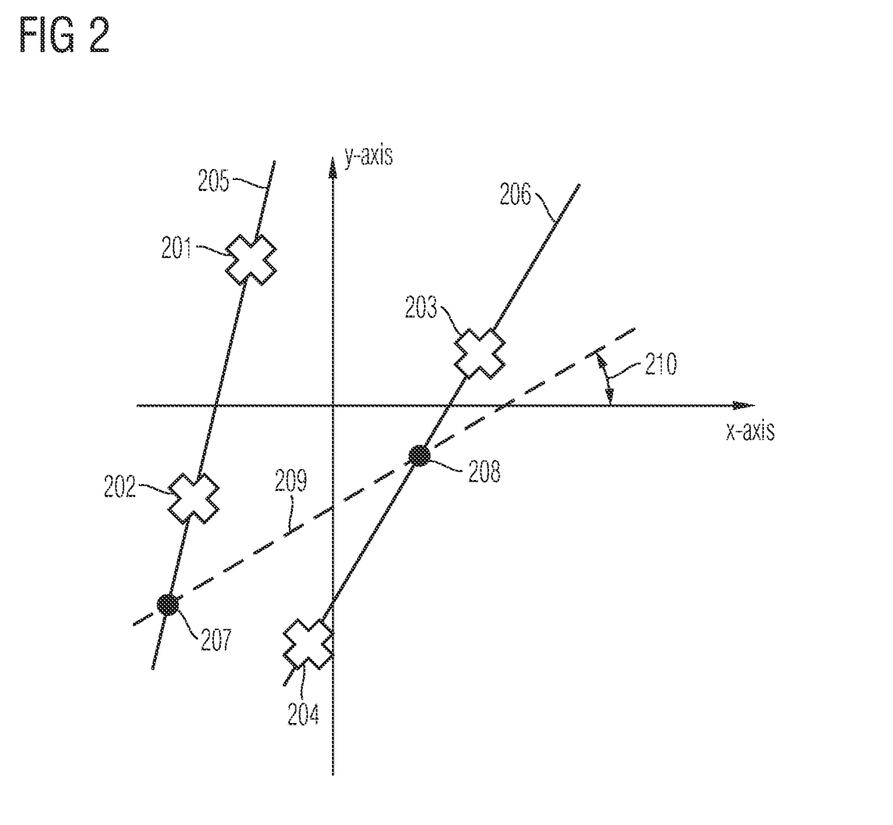
FIG. 2 shows an exemplary x-y-plane with four Hall plates, which are arranged on the main surface of a semiconductor chip, wherein the signals obtained by the Hall plates are used to interpolate two points where Bz=0, wherein the rotation angle is determined based on these two points.

FIG. 2 shows an exemplary x-y-plane with four Hall plates 201 to 204, which are arranged on the main surface of a semiconductor chip (also referred to as semiconductor substrate or (silicon) die). This semiconductor chip corresponds to the silicon die 105 depicted in FIG. 1.

The Hall plates 201 and 202 both measure the magnetic field component Bz. The shape of a magnetic field of a diametrically magnetized small magnet (of cylindrical or block shape) is shown in FIG. 2 of [U. Ausserlechner] introduced above. Hence, near the rotation axis, this shape of the Bz(x,y)-field is similar to a plane.

Hence, the magnetic field can be determined (extrapolated or interpolated) linearly by any two points on the x-y-plane, i.e. along a straight line 205 through the Hall plates 201 and 202. The Bz-field vanishes (i.e. Bz=0) somewhere on this straight line 205. This is exemplarily shown in FIG. 2 at a point 207. The measurements taken by the Hall plates 201 and 202 are thus used for linearly determining the point 207, where Bz=0. This point 207 may be located on the straight line 205 between the two Hall plates 201 and 202 or outside of both.

Accordingly, the Hall plates 203 and 204 measure the magnetic field component Bz. This measurements are used for linearly determining (i.e. inter- or extrapolating) a point 208 on a straight line 206, where Bz=0.

Next, a straight line 209 is defined by the two points 207 and 208, which is the straight line through both zero values Bz=0. An angle 210 between this straight line 209 and the x-axis can be interpreted as a rotational position of the magnet.

It is noted that the positions of the Hall plates 201 to 204 are flexible: Any position may be suitable as long as the four Hall plates 201 to 204 are not located on a single straight line.

Figure 3:
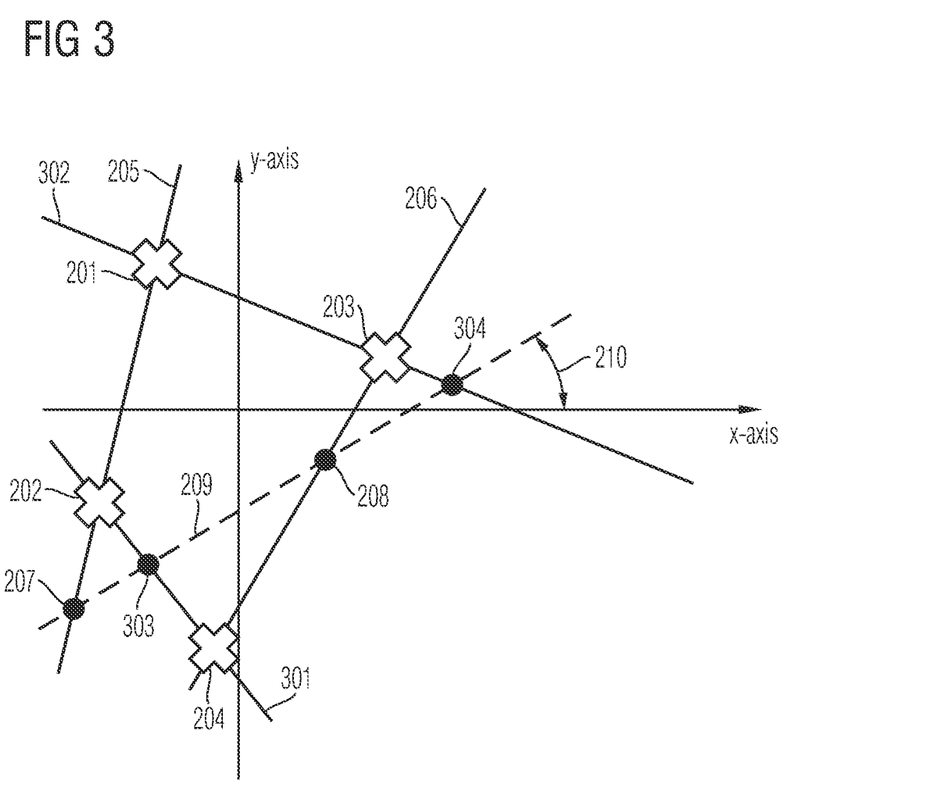
FIG. 3 shows an exemplary x-y-plane with four Hall plates, which are arranged on the main surface of a semiconductor chip, wherein the signals obtained by the Hall plates are used to interpolate four points where Bz=0, wherein the rotation angle is determined based on these four points.

FIG. 3 shows an exemplary x-y-plane with the four Hall plates 201 to 204 introduced in FIG. 2. In addition to FIG. 2, FIG. 3 shows a straight line 301 crossing the Hall plates 202 and 204. The measurements of the Hall plates 202 and 204 can be used for linearly determining a point 303 on the straight line 301, where Bz=0. Also, a straight line 302 is shown crossing the Hall plates 201 and 203. The measurements of the Hall plates 201 and 203 can be used for linearly determining a point 304 on the straight line 302, where Bz=0. The points 303 and 304 are also located on the straight line 209.

Figure 4:
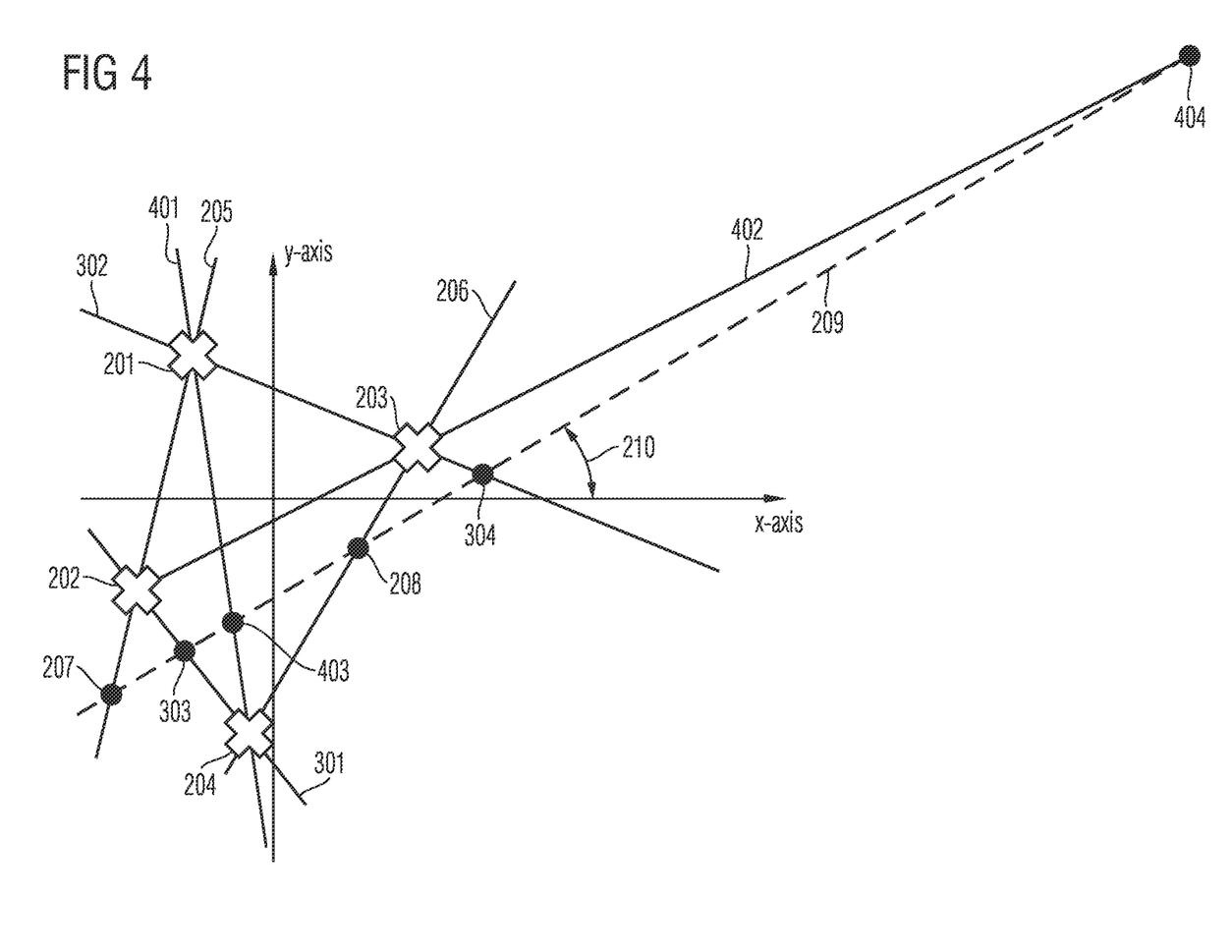
FIG. 4 shows an exemplary x-y-plane with four Hall plates, which are arranged on the main surface of a semiconductor chip, wherein the signals obtained by the Hall plates are used to interpolate six points where Bz=0, wherein the rotation angle is determined based on these six points.

FIG. 4 shows an exemplary x-y-plane with the four Hall plates 201 to 204 introduced in FIG. 2 and FIG. 3. In addition to FIG. 3, FIG. 4 shows a straight line 401 crossing the Hall plates 201 and 204. The measurements of the Hall plates 201 and 204 can be used for linearly determining a point 403 on the straight line 401, where Bz=0. Also, a straight line 402 is shown crossing the Hall plates 202 and 203. The measurements of the Hall plates 202 and 203 can be used for linearly determining a point 404 on the straight line 402, where Bz=0. The points 403 and 404 are also located on the straight line 209.

Hence, in total, the six zero-positions 207, 208, 303, 304, 403 and 404 with Bz=0 can be determined based on the measurements of the four Hall plates 201 to 204. These zero-positions lie on the straight line 209 or at least (very) close to it. Depending on the magnet and the distance between magnet and chip surface the Bz(x,y)=0-curve more or less accurately corresponds to a straight line.

The sensing system may provide at least one of the following functionalities:
(1) All or a selection of the six zero-positions can be used to determine the rotational position. For example, if at least one zero-position is far off the gravity center of the remaining zero-positions, this at least one (far off) zero-position may be assumed to be invalid and it may be ruled out (not used) for further processing.
(2) Then the sensing system may put a least square error line through all remaining zero-positions. Alternatively, if more than two zero-positions remain, the sensing system may interpolate higher order polynomials through these valid zero-positions. For example, with more than two valid zero-positions the sensing system may fit a second order polynomial $y=c0+c1 \cdot x+c2 \cdot x^2$ to the zero-positions, wherein c0, c1 and c2 are coefficients that are selected such that the polynomial y goes through the valid zero-positions or nearly through them in a least square error sense.
(3) Next, the sensing system may compute a tangent on the polynomial in a predetermined point (e.g., in the origin (x,y)=(0,0)) or in the gravity center of all zero-locations.
(4) Finally the sensing system may compute the angle between this tangent and a reference direction, which angle corresponds to the rotation angle.

It is noted that the rotation angle is not unique up to integer multiples of 180°, because the tangent defines an angle φ but also an angle φ+180°, because a unit vector along the tangent can point in two opposite directions.

The polynomial y separates the (x,y)-plane in two disjoint regions: in the first region all sensed Bz-fields are positive and in the second region all sensed Bz-fields are negative. The sensing system can determine this separation line and the two regions and use this information to discriminate between φ and φ+180°. For example, the sensing system can define a unit vector perpendicular to the tangent, pointing from the first region with positive Bz-fields to the second one with negative Bz-fields. Then it can rotate this unit vector by 90° in clock-wise direction and define the orientation of this vector as the rotational position of the magnet.

Exemplary Embodiment

Figure 5:
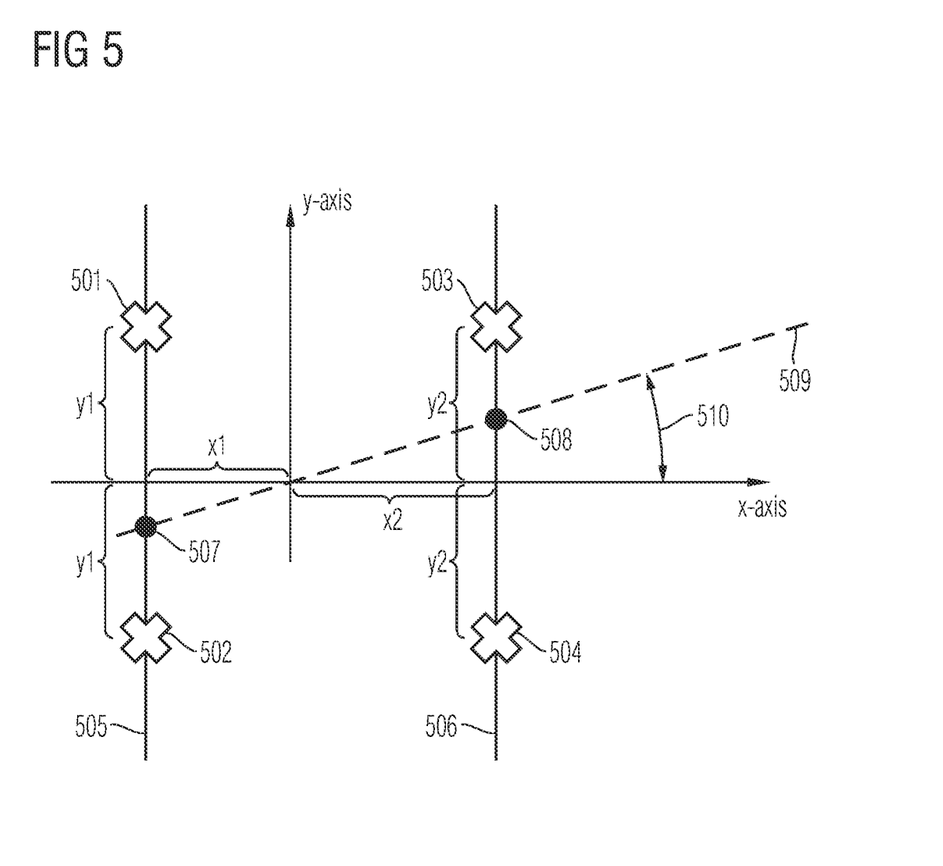
FIG. 5 shows an exemplary x-y-plane with four Hall plates, wherein the first two Hall plates are arranged on a first straight line parallel to an y-axis and the second two Hall plates are arranged on a second straight line parallel to the y-axis, wherein on each straight line a point is interpolated where Bz=0 and the rotation angle is determined based on a straight line that connects the two points.

FIG. 5 shows an exemplary x-y-plane with four Hall plates 501 to 504, which are arranged on the main surface of a semiconductor chip. This semiconductor chip corresponds to the silicon die 105 depicted in FIG. 1.

It is also an option that the four Hall plates are arranged in at least two (in particular in four) packages (e.g., one package per Hall plate), wherein the at least two packages are arranged on a substrate or carrier. In such case, the Hall plates may have a significant distance from each other (e.g., 3 cm). It is also an option that the substrate or carrier comprises a hole and the shaft is arranged such that it rotates within this hole. The magnet may further me a ring magnet that surrounds the shaft. The magnet may be arranged on top of the semiconductor chip such that in topview the Hall plates are located directly below this ring magnet.

The Hall plates 501 and 502 both measure the magnetic field component Bz. This measurements are used for linearly determining a point 507 on a straight line 505, where Bz=0.

The Hall plates 503 and 504 both measure the magnetic field component Bz. This measurements are used for linearly determining a point 508 on a straight line 506, where Bz=0.

The points 507 and 508 define a straight line 509, which goes through the origin (0,0) of the x-y-plane. An angle 510 between this straight line 509 and the x-axis can be interpreted as a rotational position (angle) of the magnet.

The straight lines 505 and 506 are in parallel to the y-axis.
The following abbreviations are used:
B1 is the magnetic Bz-field at the location of the Hall plate 501,
B2 is the magnetic Bz-field at the location of the Hall plate 502,
B3 is the magnetic Bz-field at the location of the Hall plate 503,
B4 is the magnetic Bz-field at the location of the Hall plate 504,
y1 is the distance of the Hall plates 501, 502 from the x-axis,
y2 is the distance of the Hall plates 503, 504 from the x-axis,
x1 is the distance of the Hall plates 501, 502 from the y-axis, and
x2 is the distance of the Hall plates 503, 504 from the y-axis.
On the straight line 505 the following applies:

$$Bz(y) = B2 + (y + y1) \cdot \frac{B1 - B2}{2 \cdot y1}.$$

At the point 507, the y-coordinate amounts to y120, i.e.

$$Bz(y120) = 0$$

hence $$0 = 2 \cdot y1 \cdot B2 + y120 \cdot B1 - y120 \cdot B2 + y1 \cdot B1 - y1 \cdot B2$$

$$0 = y1 \cdot B2 + y120 \cdot B1 - y120 \cdot B2 + y1 \cdot B1$$

$$y120 \cdot (B2 - B1) = y1 \cdot (B1 + B2)$$

$$y120 = y1 \cdot \frac{B1 + B2}{B2 - B1}.$$

The same applies accordingly for the straight line 506 and the point 508, for which the y-coordinate amount to y340:

$$Bz(y340) = 0$$

-continued hence $$y340 = y2 \cdot \frac{B3 + B4}{B4 - B3}.$$

The rotation angle 510 (hereinafter abbreviated with θ) can be determined as follows:

$$\tan \theta = \frac{y340 - y120}{x1 + x2}$$

hence $$\tan \theta = \frac{y2 \cdot (B3 + B4) \cdot (B2 - B1) - y1 \cdot (B1 + B2) \cdot (B4 - B3)}{(x1 + x2)(B2 - B1) \cdot (B4 - B3)}$$

and $$\theta = \arctan_2\{y2 \cdot (B3 + B4) \cdot (B2 - B1) - y1 \cdot (B1 \cdot B2) \cdot (B4 - B3);$$

$$(x1 + x2) \cdot (B2 - B1) \cdot (B4 - B3)\}$$

The arctan$_2$-calculation is based on a pointer with two coordinates, i.e. the first coordinate is $$y2 \cdot (B3+B4) \cdot (B2-B1) - y1 \cdot (B1+B2) \cdot (B4-B3)$$

and the second coordinate is $$(x1+x2) \cdot (B2-B1) \cdot (B4-B3).$$

The arctan$_2$ then supplies the angle between this pointer and a reference direction in the direction of the first coordinate.

It is noted that the arctan-function is not without ambiguity across 360°. The arctan-function ranges only from −90° to +90°. In the examples used, a range from −180° to +180° may be preferable. This can be achieved via the function arctan$_2$(x,y), which is identical with the arctan(y/x) if x≥0. However, if x<0, the following applies:

$$\arctan_2(x, y) = \arctan\frac{y}{x} - \pi,$$

which is indicated in radians (rad).

It is noted that it may suffice for the sensing system to have sensor elements only on two locations such that they lie on a straight line not going through the rotation axis. In such case, the sensing system can determine a vector from the point where the rotation axis intersects the chip surface to the point on the straight line where Bz=0. The angle between this vector and a reference direction can be determined as the rotation angle.

In order for such sensing system to also become robust against an angle error if the magnet and/or sensor element are shifted off the rotation axis and/or if a homogeneous background magnetic field is present along the sensitive direction of the sensor elements, a third sensor element may be placed at the point, where the rotation axis intersects the chip surface.

Figure 6:
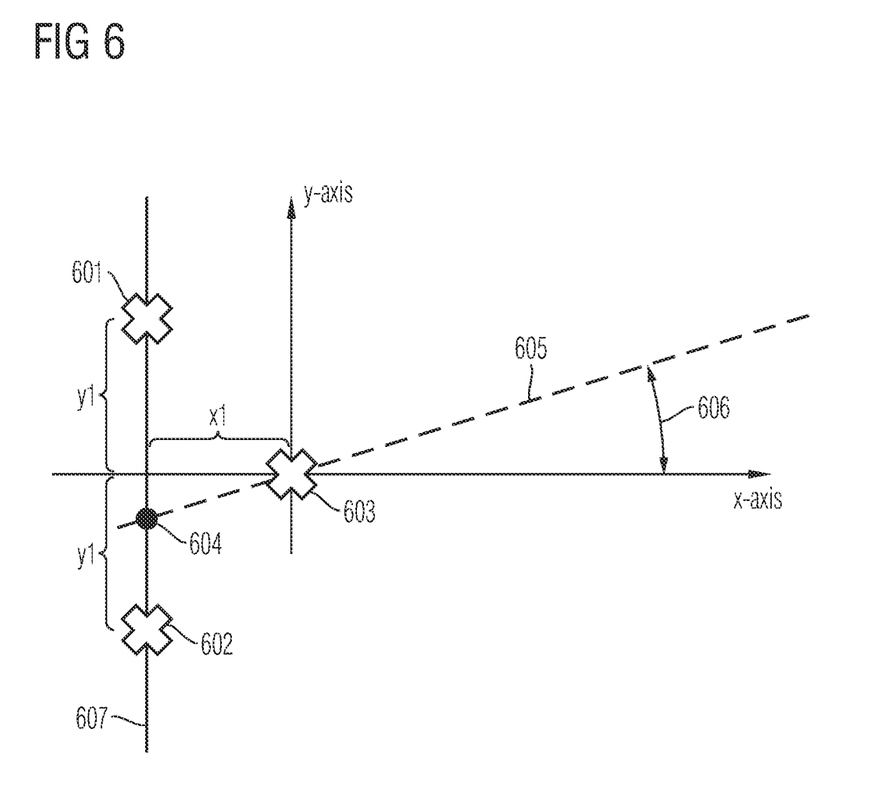
FIG. 6 shows an exemplary x-y-plane with three Hall plates, wherein the first two Hall plates are arranged on a straight line parallel to an y-axis and the third Hall is arranged on the intersection of the x-y-plane with the rotation axis, wherein on the straight line a point is interpolated where Bz=0 and the rotation angle is determined based on a straight line that connects this point and the location of the third Hall plate.

FIG. 6 shows such a scenario: An exemplary x-y-plane with three Hall plates 601 to 603 are arranged on the main surface of a semiconductor chip. This semiconductor chip corresponds to the silicon die 105 depicted in FIG. 1. The Hall plate 603 is located at the origin (0,0) of the x-y-plane, which is also the point where the rotation axis intersects the surface of the semiconductor chip. All Hall plates 601 to 603 measure the magnetic field component Bz.

The Hall plates 601 and 602 lie on a straight line 607. The measurements of the Hall plates 601 and 602 are used for linearly determining a point 604 on the straight line 607, where Bz=0.

The point 604 and the Hall plate 603 lie on a straight line 605. An angle 606 between this straight line 605 and the x-axis can be interpreted as a rotational position (angle) of the magnet.

The straight line 607 is parallel to the y-axis. The following abbreviations are used:
- B0 is the magnetic Bz-field at the location of the Hall plate 603,
- B1 is the magnetic Bz-field at the location of the Hall plate 601,
- B2 is the magnetic Bz-field at the location of the Hall plate 602,
- y1 is the distance of the Hall plates 601, 602 from the x-axis, and
- x1 is the distance of the Hall plates 601, 602 from the y-axis.

In this case homogeneous background magnetic fields are cancelled out in B1−B0 and B2−B0.

At the point 604, the y-coordinate amounts to y120, i.e.

$$Bz(y120) = 0$$

hence $$y120 = y1 \cdot \frac{(B1 - B0) + (B2 - B0)}{(B2 - B0) - (B1 - B0)}$$

$$y120 = y1 \cdot \frac{B1 + B2 - 2 \cdot B0}{B2 - B1}$$

The rotation angle 606 (hereinafter abbreviated with θ) can be determined as follows:

$$\tan \theta = \frac{y120}{x1}$$

hence $$\tan \theta = \frac{y1 \cdot (B1 + B2 - 2 \cdot B0)}{(B2 - B1) \cdot x1}$$

$$\theta = \arctan_2\{y1 \cdot (B1 + B2 - 2 \cdot B0); (B2 - B1) \cdot x1\}.$$

The arctan$_2$-calculation is based on a pointer with two coordinates, i.e. the first coordinate is $$y1 \cdot (B1+B2-2 \cdot B0)$$

and the second coordinate is $$(B2-B1) \cdot x1.$$

The arctan$_2$ then supplies the angle between this pointer and a reference direction in the direction of the first coordinate.

It is noted that the B0-term may be cancelled such that the rotation angle amounts to $$\theta = \arctan_2\{y1 \cdot (B1+B2); (B2-B1) \cdot x1\}.$$

This applies in particular in case no interference field is to be compensated (or at least partially reduced). In other words, the B0-term "−2B0" is used for (at least partially) compensating interference fields.

It is noted that the examples described herein utilize Hall plates detecting the magnetic field component Bz. However, any kind of magnetic field sensor element can be used that renders an output signal that is linearly proportional to a magnetic field component. Hence, e.g., MAG-FETs can be used. It is also possible to use other magnetic field components like the Bx-field or the By-field or any combination thereof.

The examples suggested herein may in particular be based on at least one of the following solutions. In particular combinations of the following features could be utilized in order to reach a desired result. The features of the method could be combined with any feature(s) of the device, apparatus or system or vice versa.

A magnetic angle sensing system is provided for detecting a rotation angle of a magnetic field source, wherein the magnetic field source is arranged rotatably around a rotation axis, the magnetic angle sensing system comprising at least two magnetic field sensing elements located in/on a plane;
wherein the at least two magnetic field sensing elements are not arranged on a single straight line through the rotation axis;
wherein the at least two magnetic field sensing elements provide output signals that are functions of the same magnetic field component which is in parallel to the rotation axis;
comprising a processing unit that is arranged to determine the rotation angle from an angle between a pointer and a reference direction, wherein the pointer is determined based on the output signals of the at least two magnetic field sensing elements.

It is noted that each magnetic field sensing element may comprise one or more sensors. For example, a single magnetic field sensing element may comprise four Hall plates in a 2×2-array that are arranged adjacent to each other. This 2×2 array may be used to cancel out offset errors or to connect them in parallel in order to reduce their internal resistance and improve their signal to noise ratio. This 2×2 array is regarded as a single magnetic field sensing element, because the several sensors are substantially arranged at a single location.

It is further noted that the at least two magnetic field sensing elements may be arranged on a single semiconductor chip (also referred to as semiconductor substrate or (silicon) die). However, it is also an option that the at least two magnetic field sensing elements are arranged on different semiconductor chips. The approach presented herein may hence be utilized for on-axis and off-axis angle sensor systems.

It is also noted that the at least two magnetic field sensing elements may have a substantially linear characteristics, i.e. the output signal of the magnetic field sensing element is a substantially linear function of the magnetic field component detected. For example, a deviation from the linear characteristics may be below 2% throughout the full rotation angle.

The at least two magnetic field sensing elements may in particular be arranged on a single straight line, which does not go through the rotation axis; this single straight line may in particular have a distance of at least 0.5 mm to the rotation axis.

Said processing unit may comprise at least one of the following: a processor, a microcontroller, a hard-wired circuit, an ASIC, an FPGA, a logic device.

In an embodiment, the pointer is determined based on at least two points where the magnetic field component that is perpendicular to the plane is zero or substantially zero, wherein at least one of these at least two points is determined via an interpolation along a straight line that crosses two of the at least two magnetic field sensing elements.

Each of the at least two points may be a location in a Cartesian coordinate system (x, y, z) where Bz=0, wherein the x-y-plane corresponds to the plan in which (or on which) the at least two magnetic field sensing elements are arranged and the z-axis is parallel to the rotation axis. The interpolation may comprise determining the point on the straight line in between the locations of the two magnetic field sensing elements or beyond one of magnetic field sensing element.

It is noted that one such point for Bz=0 can be determined as described above and a second point for Bz=0 can be the rotation axis intersecting the x-y-plane.

Also, at least two points for Bz=0 can be determined as explained above and these two points define the pointer, i.e. a straight line that intersects with the reference direction, wherein this intersection defines the rotation angle.

In an embodiment,
the at least two magnetic field sensing elements comprise two magnetic field sensing elements,
the pointer has a first coordinate and a second coordinate, wherein the first coordinate comprises a first weighted sum of the output signals of the two magnetic field sensing elements and the second coordinate comprises a second weighted sum of the output signals of the two magnetic field sensing elements.

At least one of the weighted sums may be a weighted difference. If there are two magnetic field sensing elements providing output signals So1 and So2, the first weighted sum of the output signals may amount to $$c0 \pm (\text{abs}(c1) \cdot So1 + \text{abs}(c2) \cdot So2).$$

The second weighted sum of the output signals may amount to $$c3 \pm (\text{abs}(c4) \cdot So1 + \text{abs}(c5) \cdot So2),$$

wherein abs(k) delivers the absolute value of k and wherein c0, c1, c2, c3, c4 and c5 are numbers.

In an embodiment, the function is a linear function or a substantially linear function.

The linear function may be any function $$f(x) = c0 + c1 \cdot x,$$

wherein c0, c1 are numbers independent of x.

It is noted that a sensor element may exhibit at least a small amount of nonlinearity, which would contribute in an additional term like $c2 \cdot x^2$, but such nonlinearity may amount to less than 2% or in particular to less than 5% of the linear portion. Hence, a suitable approximation is the linear function without the nonlinear portion.

In an embodiment, the plane comprising the at least two magnetic field sensing elements is a plane that is substantially perpendicular to the rotation axis.

In an embodiment, the plane comprising the at least two magnetic field sensing elements is a plane of a semiconductor chip.

According to an embodiment, the magnetic field sensing element comprises at least one of the following: a Hall-plate or a MAG-FET.

According to an embodiment, the at least two magnetic field sensing elements are located at at least two different positions in/on the plane.

Each of the magnetic field sensing elements may be located at a different position from any other magnetic field sensing element. The at least two magnetic field sensing elements may be arranged such that there is a distance of at least 0.5 mm between each any two magnetic field sensing elements.

In an embodiment,
the at least two magnetic field sensing elements comprise four magnetic field sensing elements, and
the pointer has a first coordinate and a second coordinate, wherein the first coordinate is proportional to the product of a difference between output signals of the first field sensing element and the second field sensing element and of a difference between the output signals of the third field sensing element and the fourth field sensing element.

In this case the first coordinate may be proportional to $$(B2-B1)\cdot(B4-B3),$$

wherein B1 is the output signal of the first field sensing element, B2 is the output signal of the second field sensing element, B3 is the output signal of the third field sensing element and B4 is the output signal of the fourth field sensing element.

In an embodiment, the processing unit is arranged to
determine a first location where the detected magnetic field substantially vanishes based on a first group of two of the at least two field sensing elements,
determine a second location where the detected magnetic field substantially vanishes based on a second group of two of the at least two field sensing elements, and
determine the pointer based on the first location and/or based on the second location.

The first location and the second location are points through which, e.g., a straight line runs. This straight line intersects the reference direction at an angle that can be perceived as the rotation angle or at least be proportional to the rotation angle.

In an embodiment, the at least two magnetic field sensing elements comprise three magnetic field sensing elements and wherein one magnetic field sensing element is located on a location where the rotation axis intersects with the plane.

Also, a method is provided for detecting a rotation angle of a magnetic field source,
wherein the magnetic field source is arranged rotatably around a rotation axis;
wherein at least two magnetic field sensing elements are located in/on a plane;
wherein the at least two magnetic field sensing elements are not arranged on a single straight line through the rotation axis;
wherein the at least two magnetic field sensing elements provide output signals that are functions of the same magnetic field component which is in parallel to the rotation axis;
the method comprising:
determining the rotation angle from an angle between a pointer and a reference direction, wherein the pointer is determined based on the output signals of the at least two magnetic field sensing elements.

In an embodiment, the pointer is determined based on at least two points where the magnetic field component that is perpendicular to the plane is zero or substantially zero, wherein at least one of these at least two points is determined via an interpolation along a straight line that crosses two of the at least two magnetic field sensing elements.

The steps described with regard to the angles system above are also applicable for the method accordingly.

A computer program product is provided, which is directly loadable into a memory of a digital processing device, wherein the computer program product comprises software code portions for performing the steps of the method as described herein.

A computer-readable medium is suggested, which has computer-executable instructions adapted to cause a computer system to perform the steps of the method as described herein.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the present disclosure have been disclosed, it will be apparent to those skilled in the art that various changes and modifications can be made which will achieve some of the advantages of the disclosure without departing from the spirit and scope of the disclosure. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the disclosure may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A magnetic angle sensing system for detecting a rotation angle of a magnetic field source arranged rotatably around a rotation axis, comprising:
   first, second, and third magnetic field sensing elements arranged in a plane and configured to provide output signals that are functions of a same magnetic field component which is in parallel to the rotation axis,
   wherein the first and second magnetic field sensing elements lie in a first straight line and are used to determine a point on the first straight line where the magnetic field component vanishes, and the third magnetic field sensing element is arranged where the rotation axis intersects the plane and lies with the point in a second straight line; and
   a processor configured to determine the rotation angle from an angle between the second straight line and a reference direction line.

2. The magnetic angle sensing system according to claim 1, wherein the plane is substantially perpendicular to the rotation axis.

3. The magnetic angle sensing system according to claim 1, wherein the plane is a plane of a semiconductor chip.

4. The magnetic angle sensing system according to claim 1, wherein the plane is a plane of a silicon die.

5. The magnetic angle sensing system according to claim 1, wherein the magnetic field sensing elements comprise Hall-plates.

6. The magnetic angle sensing system according to claim 1, wherein the magnetic field sensing elements comprise MAGFETs.

7. The magnetic angle sensing system according to claim 1, wherein the plane is an x-y plane, the first straight line is parallel to a y-axis of the x-y plane, and the reference direction line corresponds with the x-axis.

8. The magnetic angle sensing system according to claim 1, wherein the first, second, and third magnetic field sensing elements are arranged to cancel out homogeneous background magnetic fields.

9. A method for detecting a rotation angle of a magnetic field source arranged rotatably around a rotation axis, comprising:
   determining, using first and second magnetic field sensing elements that lie in a first straight line, a point on the first straight line where a magnetic field component vanishes,
   wherein the first and second magnetic field sensing elements and a third magnetic field sensing element are arranged in a plane and are configured to provide output signals that are functions of the magnetic field component which is in parallel to the rotation axis, and the third magnetic field sensing element is arranged where the rotation axis intersects the plane and lies with the point in a second straight line; and
   determining, by a processor, the rotation angle from an angle between the second straight line and a reference direction line.

10. The method according to claim 9, wherein the plane is substantially perpendicular to the rotation axis.

11. The method according to claim 9, wherein the plane is a plane of a semiconductor chip.

12. The method according to claim 9, wherein the plane is a plane of a silicon die.

13. The method according to claim 9, wherein the magnetic field sensing elements comprise Hall plates.

14. The method according to claim 9, wherein the magnetic field sensing elements comprise MAGFETs.

15. The method according to claim 9, wherein the plane is an x-y plane, the first straight line is parallel to a y-axis of the x-y plane, and the reference direction line corresponds with the x-axis.

16. The method according to claim 9, wherein the first, second, and third magnetic field sensing elements are arranged to cancel out homogeneous background magnetic fields.

* * * * *